(12) United States Patent
Evrard

(10) Patent No.: US 9,412,378 B2
(45) Date of Patent: Aug. 9, 2016

(54) DEVICE AND METHOD FOR SUPPLYING A REFERENCE AUDIO SIGNAL TO AN ACOUSTIC PROCESSING UNIT

(71) Applicant: SAGEMCOM BROADBAND SAS, Rueil Malmaison (FR)

(72) Inventor: Etienne Evrard, Rueil Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 0 days.

(21) Appl. No.: 14/425,648

(22) PCT Filed: Aug. 30, 2013

(86) PCT No.: PCT/EP2013/067960
§ 371 (c)(1),
(2) Date: Mar. 4, 2015

(87) PCT Pub. No.: WO2014/037283
PCT Pub. Date: Mar. 13, 2014

(65) Prior Publication Data
US 2015/0228282 A1    Aug. 13, 2015

(30) Foreign Application Priority Data
Sep. 6, 2012   (FR) ...................... 12 58360

(51) Int. Cl.
*G10L 21/0208*  (2013.01)
*G10L 17/22*  (2013.01)
*H04R 1/08*  (2006.01)
*G10L 15/28*  (2013.01)

(52) U.S. Cl.
CPC ............... *G10L 17/22* (2013.01); *G10L 15/28* (2013.01); *G10L 21/0208* (2013.01); *H04R 1/08* (2013.01); *G10L 2021/02082* (2013.01)

(58) Field of Classification Search
USPC .................................................. 704/226, 275
See application file for complete search history.

(56) References Cited

U.S. PATENT DOCUMENTS 5,365,516 A * 11/1994 Jandrell ............... G01S 5/0009
340/991
5,400,399 A    3/1995 Umemoto et al.
(Continued)

FOREIGN PATENT DOCUMENTS

EP    0 696 126 A1    2/1996

OTHER PUBLICATIONS

Dec. 13, 2013 Search Report issued in International Application No. PCT/EP2013/067960.
(Continued)

*Primary Examiner* — Abul Azad
(74) *Attorney, Agent, or Firm* — Oliff PLC

(57) ABSTRACT

Equipment includes a first interface intended to be connected to a sound reproduction device and at least one second interface intended to be connected to at least one microphone, an acoustic processing unit adapted for delivering an audio signal filtered by attenuation or suppression of a reference audio signal from an audio signal received via the second interface. In an initialisation phase, the equipment determines a propagation latency; configures a buffer with a reading-triggering threshold defined according to the determined propagation latency. In a nominal operating phase, the equipment transmits a third audio signal via the first interface, the third audio signal being the reference signal after passing through the buffer.

9 Claims, 5 Drawing Sheets

(56) References Cited

U.S. PATENT DOCUMENTS

Figure 1:
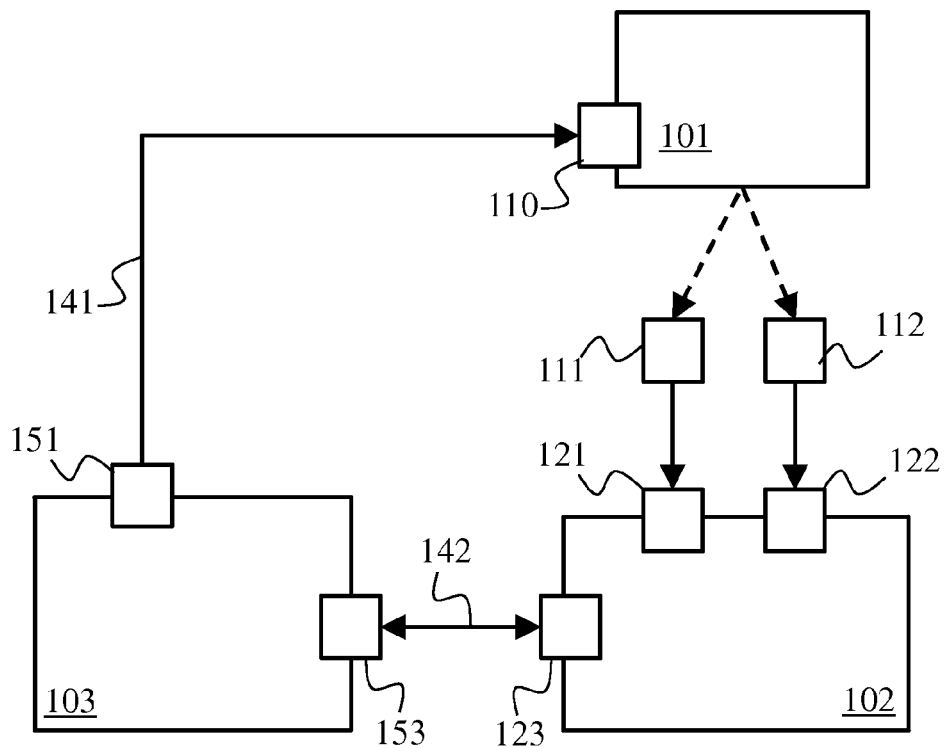

| | | | |
|---|---|---|---|
| 5,999,901 A | 12/1999 | Knittle et al. | |
| 7,190,775 B2* | 3/2007 | Rambo | H04M 9/10 379/202.01 |
| 2010/0086139 A1* | 4/2010 | Nicolino, Jr. | G10K 15/02 381/56 |

OTHER PUBLICATIONS

Translation of Mar. 19, 2015 International Preliminary Report on Patentability issued in International Application No. PCT/EP2013/067960.

* cited by examiner

DEVICE AND METHOD FOR SUPPLYING A REFERENCE AUDIO SIGNAL TO AN ACOUSTIC PROCESSING UNIT

The present invention relates to equipment comprising a first interface intended to be connected to a sound reproduction device and at least one second interface intended to be connected to at least one microphone, said equipment comprising an acoustic processing unit adapted for delivering an audio signal filtered by attenuation or suppression of a reference audio signal from an audio signal received via said second interface.

At the present time one can find numerous applications for voice recognition thus controlling equipment by voice. The difficulty lies in being able to distinguish these voice commands from a noisy environment.

The same type of problem is found in the teleconferencing world. It may sometimes be difficult to clearly distinguish the words of a speaker because of a noisy environment.

This noisy environment is often related to an audio or audiovisual content that is reproduced during the teleconference or while the user is transmitting his voice command. Let's take for example the case of a home-theatre system that one would wish to control by voice. When the home-theatre system is operating, an audible signal is reproduced in the room, potentially with a high sound volume. It would then be difficult for the system to distinguish voice commands in this situation.

There exist components for suppressing a reference audio signal using an audio signal captured thanks to one or more microphones. Electronic evaluation boards are available on the shelf on the basis of such components. However, these components and electronic evaluation boards do not enable obtaining a satisfactory result in many installation configurations. This is because, if the example is taken of the aforementioned home-theatre system, the propagation time in air of audible signals issuing from loudspeakers are dependent on the actual location of these loudspeakers and the configuration of these components and electronic boards is often unsuitable, which means that the component does not find the reference signal in the audio signal captured by the microphone.

It is therefore desirable to overcome these drawbacks of the prior art.

The invention concerns equipment comprising a first interface intended to be connected to a sound reproduction device and at least one second interface intended to be connected to at least one microphone, said equipment comprising an acoustic processing unit adapted for delivering an audio signal filtered by attenuation or suppression of a reference audio signal from an audio signal received via said second interface. The equipment is such that it comprises means for implementing an initialisation phase, comprising: means for determining a propagation latency between an instant of transmission of a first audio signal via said first interface and an instant of reception of a second audio signal via said second interface; means for configuring a buffer with a reading-triggering threshold defined according to said determined propagation latency. The equipment is such that it further comprises means for implementing a nominal operating phase, comprising: means for transmitting a third audio signal via said first interface, said third audio signal being the reference signal after passing through said buffer.

Thus it is possible to perfectly adapt the configuration of the equipment to various situations in which the voice of a user must be distinguished in a noisy or even very noisy environment because of an audio signal that the equipment sends to the reproduction device.

According to a particular embodiment, said first audio signal consists of a predefined pattern.

According to a particular embodiment, said means for determining the propagation latency comprise means for detecting the crossing of an amplitude threshold of said second audio signal.

According to a particular embodiment, said means for determining the propagation latency comprise a North filter applied between said first audio signal and said second audio signal.

According to a particular embodiment, said means for implementing the initialisation phase are implemented in a control unit connected to an output of the acoustic processing unit so as to receive said filtered audio signal, and the control unit deactivates any transmission of a reference audio signal to said acoustic processing unit during said initialisation phase.

According to a particular embodiment, said means for implementing the initialisation phase, said first interface and said means for transmitting the third audio signal are implemented in a first device, and the acoustic processing unit and said second interface are implemented in a second device intended to be connected to said first device.

According to a particular embodiment, said microphone(s) being unidirectional, the acoustic processing unit and said microphone(s) are implemented in a box comprising, for each microphone, a first slot and a second slot, and each microphone is installed in a cavity of a support in which a first slot and a second slot are also formed, and placed so as to correspond respectively to said slots in the box when said support is mounted in said box, said support being adapted so that the distances between said first slots and a face of said microphone placed in the direction of an audible signal to be favoured and the distances between said second slots and a face opposite said microphone are substantially identical.

The invention also relates to a method implemented by equipment comprising a first interface intended to be connected to a sound reproduction device and at least one second interface intended to be connected to at least one microphone, said equipment comprising an acoustic processing unit adapted for delivering an audio signal filtered by attenuation or suppression of a reference audio signal from an audio signal received via said second interface. The method is such that it comprises an initialisation phase comprising the following steps: determining a propagation latency between an instant of transmission of a first audio signal via said first interface and an instant of reception of a second audio signal via said second interface; configuring a buffer with a reading-triggering threshold defined according to said determined propagation latency. The method is such that it further comprises a nominal operating phase comprising the following step: transmitting a third audio signal via said first interface, said third audio signal being said reference signal after passing through said buffer.

The invention also concerns a computer program, which may be stored on a medium and/or downloaded from a communications network, so as to be read by a processor. This computer program comprises instructions for implementing any of the methods mentioned above, when said program is executed by the processor. The invention also relates to storage means comprising such a computer program.

Figure 2A:
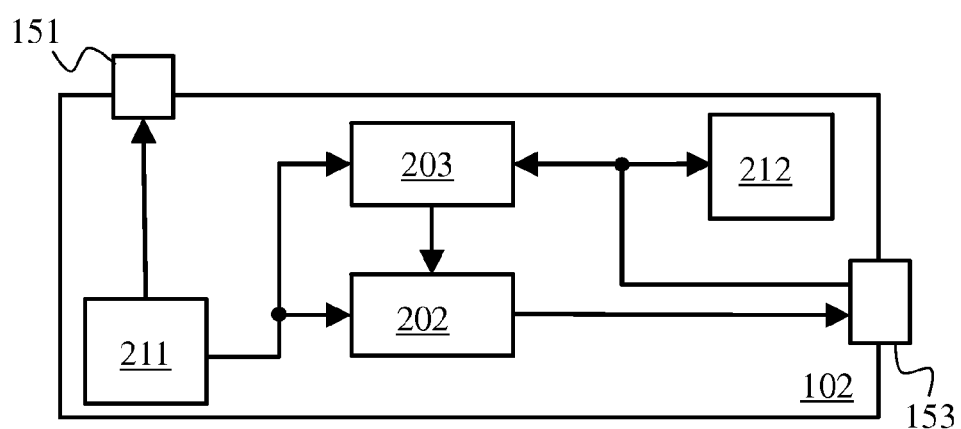
Figure 2B:
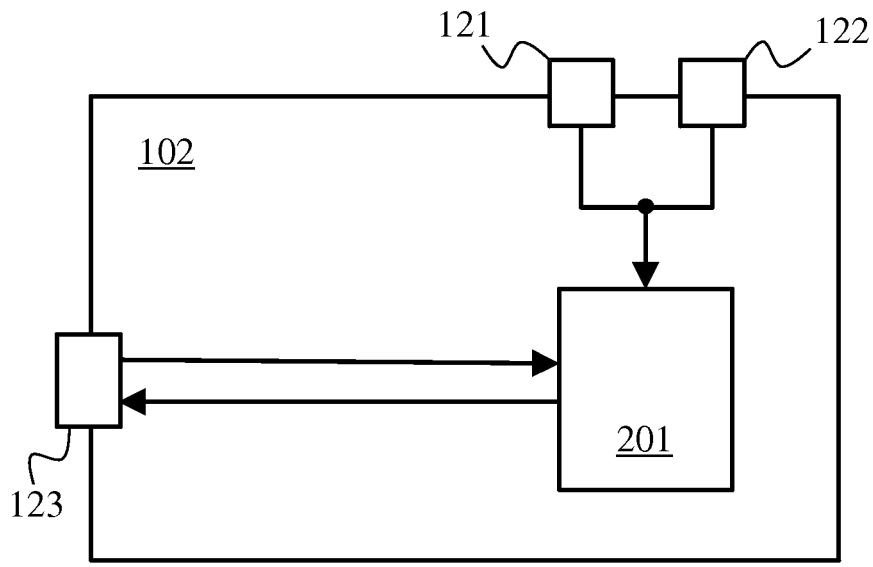
Figure 3:
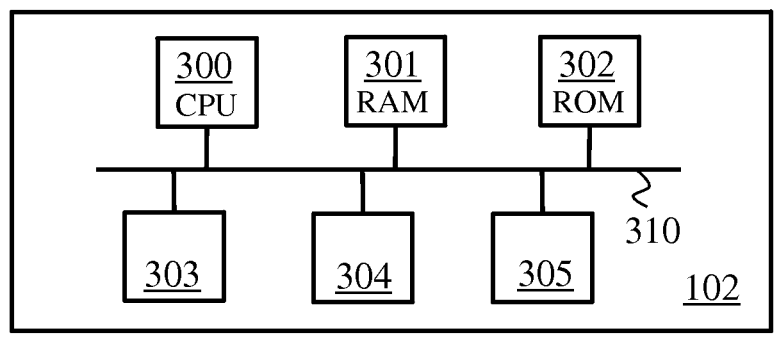
Figure 4:
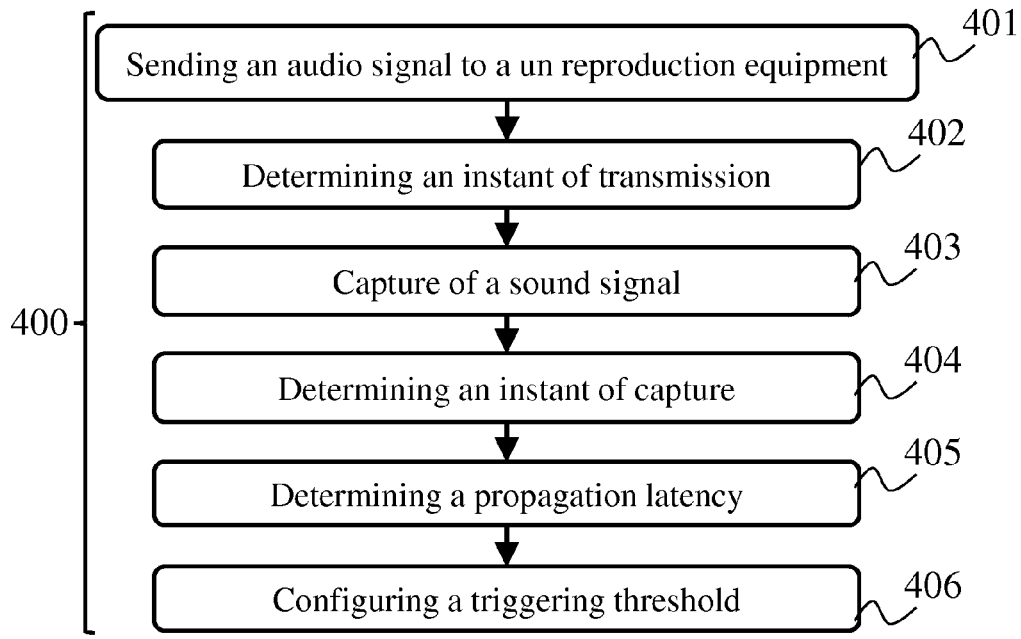
Figure 5:
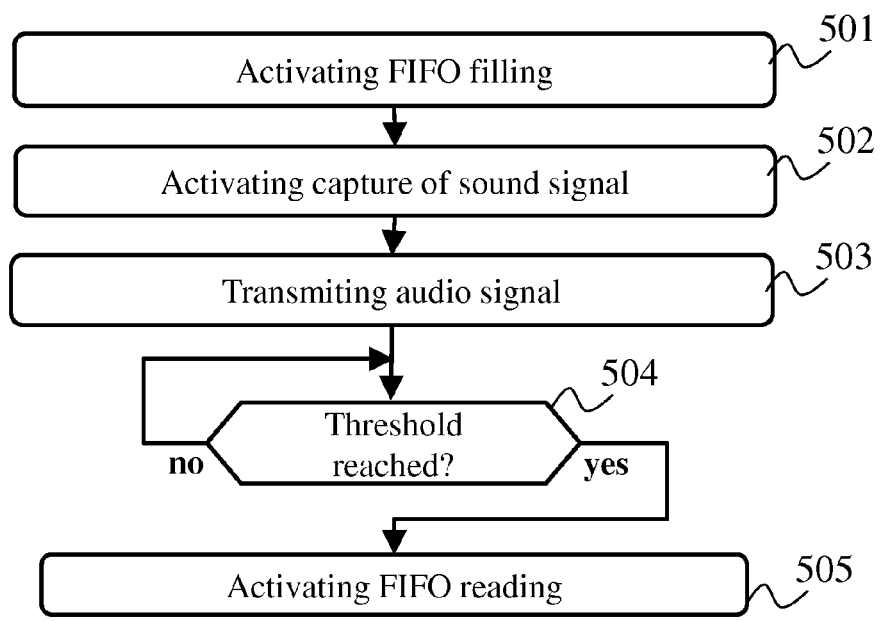
Figure 6:
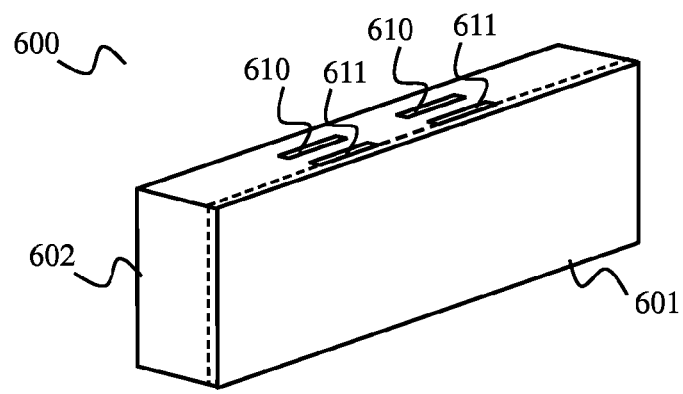
Figure 7A:
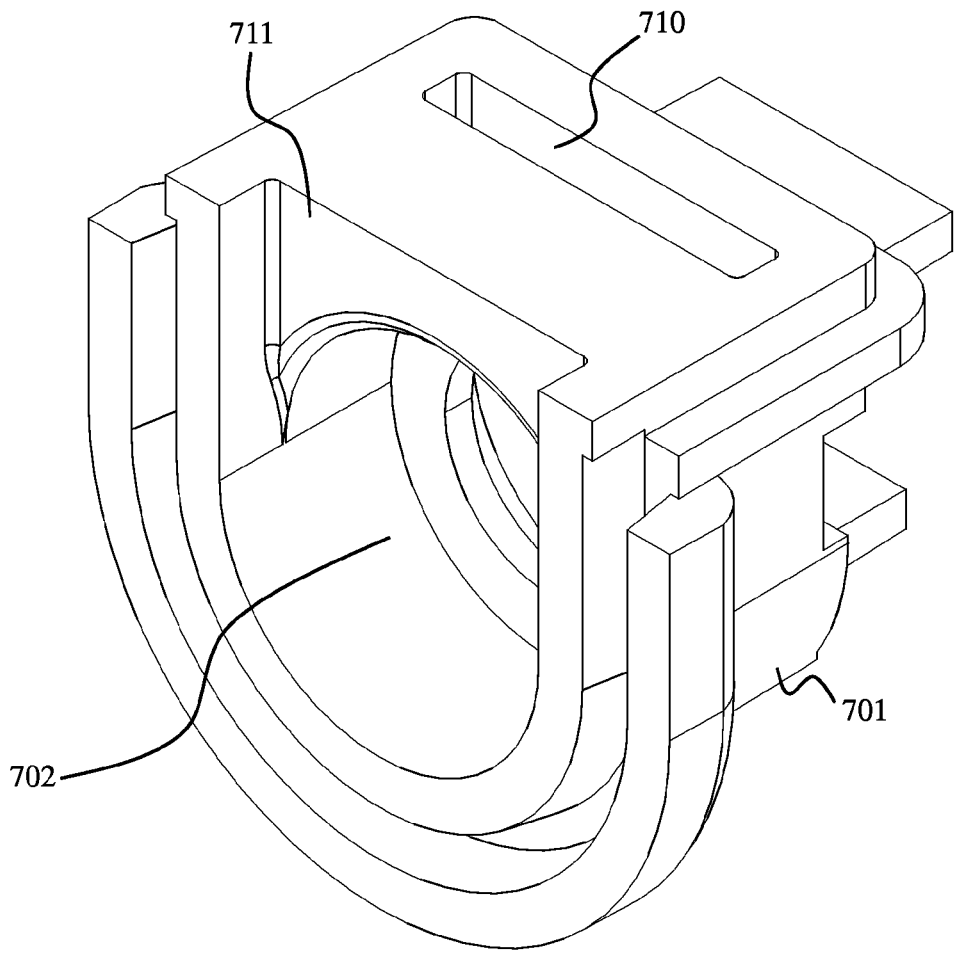
Figure 7B:
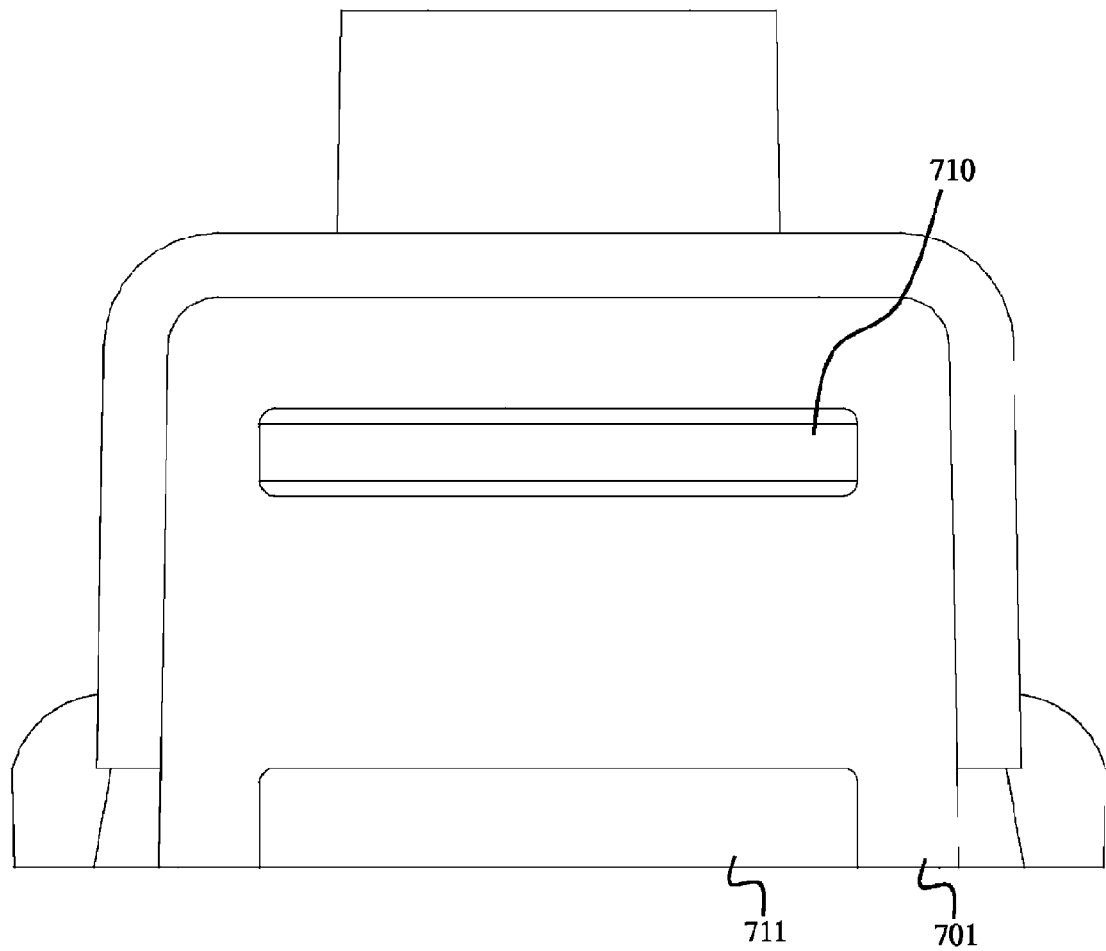

The features of the invention mentioned above, as well as others, will emerge more clearly from a reading of the following description of an example embodiment, said description being given in relation to the accompanying drawings, among which:

FIG. 1 schematically illustrates a system in which the invention may be implemented;

FIG. 2A schematically illustrates an example of hardware architecture of a source device of the system of FIG. 1;

FIG. 2B schematically illustrates an example of hardware architecture of an acoustic processing device of the system of FIG. 1;

FIG. 3 schematically illustrates another example of hardware architecture of a source device;

FIG. 4 schematically illustrates an algorithm for initialising the source device;

FIG. 5 schematically illustrates an algorithm of nominal operating of the source device;

FIG. 6 schematically illustrates a simplified perspective view of a shell of a box in which the acoustic processing device may be installed;

FIG. 7A schematically illustrates a perspective view of a microphone support intended to be placed in the box;

FIG. 7B illustrates schematically another view of the microphone support.

In a system in which a reproduction device is intended to reproduce, in the form of an audible signal, an audio signal supplied by source equipment, it is proposed to implement an initialisation phase in which a propagation latency is determined between the emission of the audio signal by the source equipment and the reception of a corresponding audible signal by at least one microphone intended to capture at least the voice of a user in a nominal operating phase. A buffer is then configured with a reading-triggering threshold defined according to the determined propagation latency. Then, in the nominal operating phase, when the equipment transmits an audio signal to the reproduction device, the equipment also transmits it to the buffer, which thus causes a delay. An acoustic processing unit adapted for delivering an audio signal filtered by attenuation or suppression of a reference audio signal from a received audio signal is used, with, as input, what is captured by the microphone or microphones and with, as reference signal, the signal delayed by the buffer.

FIG. 1 schematically illustrates a system in which the invention may be implemented.

The system in FIG. 1 comprises an audio or audiovisual signal source device 103. According to a first example, the source device 103 is a digital decoder adapted for receiving and decoding audiovisual signals coming from a satellite link or an Ethernet link to a home gateway via which audiovisual contents are received from the Internet. According to a second example, the source device 103 is a Blu-Ray (registered trade mark) reader or a computer on which a media player is executed. Any device adapted for supplying an audio signal intended to be reproduced by a sound reproduction device can be used.

The system of FIG. 1 further comprises a sound reproduction device 101, which may be an audiovisual reproduction device. According to a first example, the sound reproduction device 101 is a screen comprising integrated loudspeakers. According to a second example, the sound reproduction device 101 is a hi-fi amplifier.

The source device 103 comprises an interface 151 for being connected to the sound reproduction device 101 by means of a link 141. The sound reproduction device 101 comprises an interface 110 for being connected to the source device 103 via the link 141. For example, the link 141 is in accordance with the HDMI (High-Definition Multimedia Interface), WHDI (Wireless Home Digital Interface), SPDIF (Sony/Philips Digital Interconnect Format) or Peritel (registered trade mark) specifications. Thus the sound reproduction device 101 is capable of reproducing any audio signal received from the source device 103 via the link 141.

The system of FIG. 1 further comprises an acoustic processing device 102 and at least one microphone 111, 112. The acoustic processing device 102 comprises at least one interface 121, 122 adapted for connecting the microphone or microphones 111, 112. The acoustic processing device 102 is thus able to receive audio signals corresponding to sound signals captured by the microphone or microphones 111, 112. The acoustic processing device 102 also comprises an interface 123 for being connected to the source device 103 by means of a link 142. The source device 103 comprises an interface 153 for being connected to the acoustic processing device 102 via the link 142. For example, the link 142 is in accordance with the HDMI, USB (Universal Serial Bus) or IEEE 1394 specifications.

The microphone(s) 111, 112 enable(s) capturing a sound environment, and in particular the sound signals broadcast by the reproduction device 101 and the voice of a user of the system.

The source device 103 and the acoustic processing device 102 may be incorporated in the same box and may further be implemented on a same Printed Circuit Board (PCB), the link 142 then being a track of the Printed Circuit Board.

FIG. 2A schematically illustrates an example of hardware architecture of the source device 103.

The source device 103 comprises an audio signal supplying unit 211 for supplying an audio signal, for example resulting from a demultiplexing and decoding of an audiovisual signal received via a satellite link. The audio signal is supplied to the interface 151 and to the input of a buffer 202 of the FIFO (First-In First-Out) type of the source device 103. During an initialisation phase, the audio signal is also supplied to a control unit 203 of the source device 103. During the initialisation phase, another audio signal, coming from the interface 153, is also supplied to the control unit 203.

The audio signal supplying unit 211 may further comprise a generator generating an audio signal according to a predefined pattern, usable during the initialisation phase.

The aforementioned initialisation phase is detailed hereafter in relation to FIG. 4, and a subsequent phase of nominal operating of the source device 103 is detailed hereafter in relation to FIG. 5.

The source device 103 comprises a processing unit 212 intended to apply a processing to a filtered audio signal, coming from the interface 153. According to a first example, the processing unit 212 implements a voice recognition mechanism. According to a second example the processing unit 212 implements a shaping mechanism for transmitting the filtered audio signal in the context of a teleconference.

FIG. 2B illustrates schematically an example of hardware architecture of the acoustic processing device 102.

The acoustic processing device 102 comprises an acoustic processing unit 201, the function of which is to suppress a first audio signal, referred to as reference signal, from a second audio signal. The reference audio signal is supplied by the source device via the link 142. The second audio signal is the audio signal resulting from the sound signal captured by the microphone(s) 111, 112. The acoustic processing unit 201 then supplies, to the source device 103 via the link 142, a filtered audio signal, i.e. devoid as far as possible of the reference audio signal, when this reference audio signal has been detected in the signal captured by the microphone(s). For example, the acoustic processing unit 201 is a component with reference CX20708-21X from the company Connexant.

It should be noted that the acoustic processing unit 201 may comprise an internal buffer performing the processing operations expected by the acoustic processing unit 201. However, this internal buffer serves only to store the audio signals during a predefined time window, for example around 200 ms, so as to carry out these processing operations. No reading-triggering threshold is associated therewith and cannot be configured.

FIGS. 2A and 2B are respectively complementary examples of hardware architecture of the source device 103 and of the acoustic processing device 102. A different distribution of the functions implemented can be envisaged. For example, the control unit 203 and/or the FIFO 202 can be implemented in the acoustic processing device 102. The arrangement according to FIGS. 2A and 2B does however have the advantage of allowing easy update of devices supplying audio or audiovisual contents already deployed, for example in private households. This is because, taking the example of satellite decoders or of television over IP (Internet Protocol), these implement numerous functions by software. It is then easy to upgrade this software in order to implement the functions described herein in relation to the source device 103. It would then be sufficient to add thereto the acoustic processing device 102 in order to implement the invention, without having to replace the hardware platform of these decoders.

The term "equipment" will be used to designate either a device or a set of devices implementing these functions.

FIG. 3 schematically illustrates another example of hardware architecture of the source device 103, which then comprises, connected by a communication bus 310: a processor or CPU (Central Processing Unit) 300; a random access memory RAM 301; a read-only memory 302, a storage unit or a storage-medium reader, such as a Hard Disk Drive HDD 303; a first interface 304 for communicating via the link 141; and a second interface 305 for communicating via the link 142.

It should be noted that the acoustic processing device 102 can be implemented with a similar hardware architecture.

In the context of the architecture presented in FIG. 3, the FIFO 202 can be implemented within the second interface 305 or within the RAM 301, for example in the form of a concatenated list.

The processor 300 is capable of executing instructions loaded into the RAM 301 from the ROM 302, from an external memory (not shown), from a storage medium such as the hard disk drive HDD 303, or from a communications network. When the source device 103 is powered up, the processor 300 is capable of reading instructions from the RAM 301 and executing them. These instructions form a computer program causing the implementation, by the processor 300, of all or some of the algorithms and steps described hereafter. All or some of the algorithms and steps described hereafter can be implemented in software form by the execution of a set of instructions by a programmable machine, such as a DSP (Digital Signal Processor) or a microcontroller, or be implemented in hardware form by a machine or a dedicated component, such as an FPGA (Field-Programmable Gate Array) or an ASIC (Application-Specific Integrated circuit).

FIG. 4 schematically illustrates an algorithm implementing an initialisation phase 400 of the source device 103.

In a step 401, the source device 103 sends an audio signal via the interface 151. This audio signal preferably corresponds to a predefined pattern. This audio signal may also a priori be unknown to the source device 103, for example resulting from a demultiplexing and decoding of an audiovisual signal received by the source device 103 via a satellite link. In the architecture presented in FIG. 2A, the source device 103 also sends the audio signal to the control unit 203.

In a following step 402, the source device 103 determines information representative of an instant at which the source device 103 has sent the audio signal via the interface 151. The audio signal sent by the source device 103 is therefore intended to be reproduced by the reproduction device 101. The reproduction device 101 decodes the audio signal transmitted by the source device 103 and generates a corresponding sound signal, the microphone(s) 111, 112 being adapted for capturing this sound signal.

In a following step 403, the source device 103 performs, or requests, a sound-environment capture. To do so, the source device 103 instructs the acoustic processing device 102, via the link 142, to start a sound-environment capture thanks to the microphone(s) 111, 112. During this initialisation phase, the source device 103 does not transmit any reference audio signal to the acoustic processing device 102 via the interface 153. The acoustic processing device 102 then retransmits directly to the source device 103 the audio signal corresponding to the sound signal captured by the microphone(s) 111, 112, no reference audio signal having to be suppressed from the sound signal captured by the microphone(s) 111, 112. In the architecture presented in FIG. 2A, the source device 103 sends the audio signal received from the acoustic processing device 102 to the control unit 203.

In a following step 404, the source device 103 determines information representative of an instant at which the acoustic processing device 102 has received the audio signal thanks to the microphone(s) 111, 112. It can be considered that the instant at which the acoustic processing device 102 has received the audio signal thanks to the microphone(s) 111, 112 is the same as that at which the source device 103 has received the audio signal via the interface 153. It is then considered that the processing operations performed by the acoustic processing device 102 have negligible latency. If such is not the case, the source device 103 has, by configuration, knowledge of this latency and can thus take it into account.

In order to determine the instant at which the acoustic processing device 102 received the audio signal thanks to the microphone(s) 111, 112, the source device 103 detects an instant at which the audio signal received by the interface 153 is above a predefined threshold. The source device 103 then considers that this instant of crossing said predefined threshold is the one at which the acoustic processing device 102 received the audio signal thanks to the microphone(s) 111, 112. According to a variant embodiment, the source device 103 makes a correlation between the audio signal sent via the interface 151 and the audio signal received via the interface 153, in order to determine to which time window the audio signal sent corresponds in the received audio signal. To do so, a matched filter, also referred to as North filter, can be applied. The use of such a filter advantageously maximises the signal to noise ratio. Other correlation methods may be used.

In a following step 405, the source device 103 determines information representative of a propagation latency, which is the difference between the instant at which the acoustic processing device 102 received the audio signal thanks to the microphone(s) 111, 112 and the instant at which the source device 103 sent the audio signal via the interface 151. This propagation latency is determined thanks to the information determined in steps 404 and 402 respectively.

In a following step 406, the source device 103 determines information representative of a triggering threshold of the FIFO 202, to be implemented during the nominal operating phase of the source device 103. This triggering threshold of the FIFO 202 is determined according to the propagation latency determined at the step 405, and enables applying a delay to the reference audio signal to be transmitted to the acoustic processing device 102 via the interface 153. If the propagation time between the source device 103 and the acoustic processing device 102 is neglected, this delay is equal to the propagation latency determined at the step 405. Otherwise this delay is equal to the propagation latency determined at the step 405 from which a predefined value of the propagation time between the source device 103 and acoustic processing device 102 is subtracted.

Then, the source device 103 configures the FIFO 202 so that, in the nominal operating phase, the triggering threshold determined at the step 405 is applied. The initialisation phase is then ended and the nominal operating phase can begin.

The source device 103 may supply to the user an indication that the initialisation phase is under way, for example by means of an LED (Light Emitting Diode) of a user interface. This can enable the user to know whether he must limit any ambient noise in order to facilitate the detection of the audio signal expected in return by the source device 103.

In the architecture presented in FIG. 2A, the steps 402, 404, 405 and 406 are performed by the control unit 203.

FIG. 5 schematically illustrates an algorithm of nominal operating of the source device 103, once the initialisation phase has been executed.

In a step 501, the source device 103 activates the filling of the FIFO 202. No data item is then present in the FIFO 202.

In a following step 502, the source device 103 activates the sound signal capture thanks to the microphone(s) 111, 112. To do this, the source device 103 sends to the acoustic processing device 102 an instruction to trigger such a capture. An audio signal corresponding to the sound signal captured by the microphone(s) 111, 112 is then received by the acoustic processing unit 201.

In a following step 503, the source device 103 activates the sending of an audio signal to the reproduction device 101 via the interface 151. This audio signal results for example from a demultiplexing and decoding of an audiovisual content received or read by the source device 103. The source device 103 having activated the filling of the FIFO 202, the audio signal is also stored in the FIFO 202.

In a following step 504, the source device 103 checks whether the filling threshold of the FIFO 202 determined at the step 406 is reached. If such is the case, a step 505 is performed; otherwise the step 504 is reiterated.

In the step 505, the source device 103 activates the reading of the FIFO 202. The data stored in the FIFO 202 are then transmitted as a reference audio signal to the acoustic processing device 102 via the interface 153. This reading of the FIFO 202 takes place at the rate at which the data of the audio signal are written in the FIFO 202. A time delay, the duration of which is adapted so as to compensate for the propagation latency determined at the step 405, is thus applied to the audio signal supplied by the source device 103 to the acoustic processing device 102.

Thus, thanks to the application of this delay, the audio signals input to the acoustic processing unit 201 are sufficiently synchronised to enable the acoustic processing unit 202 to suppress the reference audio signal from the audio signal corresponding to the sound signal captured by the microphone(s) 111, 112. In this way, the audio signal supplied to the processing unit 212 is filtered and substantially devoid of the sound signal corresponding to the audio signal reproduced by the reproduction device 101. A slight noise may however remain through the distortions in the sound signal captured by the microphone(s) 111, 112 with respect to the reference audio signal. Then, when the user wishes to use voice commands or participate in a teleconference, his voice can be clearly distinguished in the audio signal, even if the sound volume of the reproduction device 101 is high.

FIG. 6 schematically illustrates a simplified perspective view of a shell of a box 600 in which the acoustic processing device 102 may be installed.

The shell of the box 600 comprises a first part 601 and a second part 602. The two parts 601 and 602 are intended to be connected to each other, for example by adhesive bonding, or by means of assembly screws, or using clips.

Preferably, said first part 601 serves as a cover for said second part 602. The external thickness of this first part is shown in broken lines in FIG. 6. The acoustic processing device 102 consists of an electronic board on which components fulfilling the previously described functions are mounted. The electronic board is mounted on the internal face of said first part 601. The electronic board may be assembled with said first part 601 by means of assembly screws, rivets or clips.

The microphones 111, 112 are also integrated in the box 600, the shell of which comprises, for each microphone 111, 112, a first slot 610 and a second slot 611. These slots 610, 611 enable the microphones 111, 112 to capture the sound environment, as described hereafter in relation to FIGS. 7A and 7B. In the illustration in FIG. 6, the slots 610, 611 are formed in said second part 602 of the shell.

FIG. 7A schematically illustrates a perspective view of a microphone support 701 intended to be placed in the box 600. Each microphone 111, 112 is then unidirectional and has an associated support 701.

The support 701 intended to receive the microphone 111 or 112 in an adjusted manner is preferably manufactured from rubber, so as to isolate the microphone 111 or 112 from vibrations transmitted by mechanical parts of the box 600. Microphones with the reference CM1045RFH-35BL-C56F1K-LF from the company MWM Acoustics are for example used.

On one face of the support 701, two slots 710, 711 are formed, intended to be respectively placed so as to match the slots 610, 611 formed in the shell of the box 600, when the support 701 is installed in the box 600.

The support 701 has a cavity 702 emerging on the slots 710, 711, and intended to receive the microphone 111 or 112. Once installed in the cavity 702, the microphone 111 or 112 is disposed so that a face of the microphone 111 or 112 in the direction of the sound signal to be favoured is inline with the slot 711 and therefore with the slot 611; furthermore, the microphone 111 or 112 is disposed so that the face of the microphone 111 or 112 opposite to the direction of the sound signal to be favoured is inline with the slot 710 and therefore the slot 610. In typical designs of unidirectional microphones this face opposite to the direction of the sound signal to be favoured comprises a hole that enables the sounds other than those to be favoured to enter through the rear, i.e. those that come from directions other than the one from which the sound signal to be favoured comes. In other words, this hole attenuates the ambient noise without eliminating it. To do so, it is however necessary for the propagation times of the sound signal from the slots made in the shell of the box 600 and the aforementioned two faces of the microphone 111, 112 to be substantially identical, i.e. for the distances between these slots and these faces to be substantially identical. The arrangement of the support 701 enables achieving this objective. The term "substantially" means that any difference existing is negligible with regard to the reactivity of the microphone.

The combination of the support 701 as presented and at least one microphone 111, 112 thus enables highlighting the sound signal (the voice of the user in the system of FIG. 1) in the direction favoured by the unidirectional microphone(s) 111, 112. "Highlighting" means bringing out the voice of the user with respect to the other sounds in the sound environment. This facilitates the processing carried out by the acoustic processing device 102.

FIG. 7B schematically illustrates another view of the microphone support 701. It is clear, more prominently in this view, that the slot 711 is preferably formed by a step, or recess. The slot 711 is thus definitively formed when the support 701 is mounted in abutment on the internal face of the first part 601 of the shell of the box 600.

It should be noted that the support 701 can be used to install a unidirectional microphone in a box without implementing the processing operations implemented by the source 103 and acoustic processing 102 devices. This enables improving the prominence of the voice of the user.

The invention claimed is:

1. Equipment comprising a first interface intended to be connected to a sound reproduction device and at least one second interface intended to be connected to at least one microphone, said equipment comprising an acoustic processing unit adapted for delivering an audio signal filtered by attenuation or suppression of a reference audio signal from an audio signal received via said second interface, wherein said equipment is configured for implementing an initialisation phase comprising:
   determining a propagation latency between an instant of transmission of a first audio signal via said interface and an instant of reception of a second audio signal via said second interface; and
   configuring a buffer with a reading-triggering threshold defined according to said determined propagation latency,
   wherein said equipment is further configured for implementing a nominal operating phase comprising:
   transmitting a third audio signal via said first interface, the reference signal used by the acoustic processing unit resulting from a passage of the third audio signal through said buffer.

2. The equipment according to claim 1, wherein said first audio signal consists of a predefined pattern.

3. The equipment according to claim 1, wherein determining the propagation latency comprises detecting a crossing of an amplitude threshold of said second audio signal.

4. The equipment according to claim 1, wherein determining the propagation latency comprises applying a North filter between said first audio signal and said second audio signal.

5. The equipment according to claim 1, wherein the initialisation phase is implemented in a control unit connected to an output of the acoustic processing unit for receiving said filtered audio signal, and wherein the control unit is configured for deactivating any transmission of reference audio signal to said acoustic processing unit during said initialisation phase.

6. The equipment according to claim 1, wherein a first device implements the initialisation phase and said first interface, and is configured for transmitting the third audio signal,
   and wherein the acoustic processing unit and said second interface are implemented in a second device intended to be connected to said first device.

7. The equipment according to claim 1, wherein, said microphone(s) being unidirectional, the acoustic processing unit and said microphone(s) are implemented in a box comprising, for each microphone, a first slot and a second slot,
   and wherein each microphone is installed in a cavity of a support in which a first slot and a second slot are also formed, and placed so as to correspond respectively to said slots in the box when said support is mounted in said box,
   wherein said support is adapted so that the distances between said first slots and a face of said microphone placed in the direction of a sound signal to be favoured and the distances between said second slot and an opposite face of said microphone are substantially identical.

8. A method implemented by equipment comprising a first interface connected to a sound reproduction device and at least one second interface connected to at least one microphone, said equipment comprising an acoustic processing unit adapted for delivering an audio signal filtered by attenuation or suppression of a reference audio signal from an audio signal received via said second interface, wherein said method comprises an initialisation phase comprising:
   determining a propagation latency between an instant of transmitting a first audio signal via said first interface and an instant of reception of a second audio signal via said second interface; and
   configuring a buffer with a reading-triggering threshold defined according to said determined propagation latency,
   wherein the method further comprises a nominal operating phase comprising:
   transmitting a third audio signal via said first interface, the reference signal used by the acoustic processing unit resulting from a passage of the third audio signal through said buffer.

9. Non-transitory storage medium storing a computer program comprising instructions for implementing, by equipment, the method according to claim 8, when said program is executed by a processor of said equipment.

* * * * *